(12) United States Patent
White et al.

(10) Patent No.: US 6,543,684 B1
(45) Date of Patent: Apr. 8, 2003

(54) TRANSACTION TERMINAL WITH PRIVACY SHIELD FOR TOUCH-SCREEN PIN ENTRY

(75) Inventors: Daniel F. White, Lilburn, GA (US); Stephen J. Chasko, Flowery Branch, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/537,034

(22) Filed: Mar. 28, 2000

(51) Int. Cl.⁷ .............................................. G06F 17/60
(52) U.S. Cl. ...................................... 235/379; 235/382
(58) Field of Search ................................ 235/379, 382; 705/76

(56) References Cited

U.S. PATENT DOCUMENTS

| | | | |
|---|---|---|---|
| 5,544,040 A | | 8/1996 | Gerbaulet |
| 5,589,855 A | * | 12/1996 | Blumstein et al. ............ 235/379 |
| 5,859,414 A | | 1/1999 | Grimes et al. |
| 6,065,679 A | * | 5/2000 | Levie et al. ............ 235/462.47 |
| 6,202,924 B1 | * | 3/2001 | Saunders .................... 235/379 |

OTHER PUBLICATIONS

Merriam–Webster Collegiate Dictionary Online.*

* cited by examiner

Primary Examiner—Michael G. Lee
Assistant Examiner—Lisa M. Caputo
(74) Attorney, Agent, or Firm—Maginot, Moore & Bowman LLP

(57) ABSTRACT

A transaction terminal includes a touch-screen display and various peripherals in electronic communication with and under the control of a processing unit. A PIN entry area is generated by the processing unit that includes a video keypad. The video keypad, in conjunction with the touch-screen, allows entry of a PIN, ID, or the like. A shield or barrier is provided adjacent at least a portion of the video keypad of the PIN entry area that aids in the prevention of eavesdropping by a third party during PIN entry. In one form, at least one shield extends over and above the video keypad for extra privacy. In another form, walls are situated adjacent sides of the video keypad. Preferably, the PIN entry area is also labeled as such on the display independent of the display region in order to indicate the only proper place for PIN entry to the user. This aids in preventing Trojan horse applications that can show a false PIN entry area on another part of the display region in order to fraudulently obtain a user's PIN.

22 Claims, 4 Drawing Sheets

Enter PIN here only

TRANSACTION TERMINAL WITH PRIVACY SHIELD FOR TOUCH-SCREEN PIN ENTRY

FIELD OF THE INVENTION

The present invention relates generally to business/retail systems and, more particularly, to a transaction terminal having touch-screen PIN entry.

DESCRIPTION OF THE PRIOR ART

Today, a number of electronic retail terminals may be used throughout the retail store. For example, the retail store may include a number of point-of-sale (POS) terminals such as traditional assisted (i.e. clerk-operated) checkout terminals. In addition to assisted POS terminals, the retail store may also include a number of unassisted POS terminals such as self-service checkout terminals. Self-service checkout terminals are retail terminals which are operated by a customer without the assistance of a retail clerk. Such systems typically allow only for the scanning of products, limited payment options, and providing a customer receipt. A small display may be provided that shows a limited or abbreviated description of the product and its price.

Moreover, in addition to POS terminals, the retail store may also include a number of information retail terminals such as kiosk-type devices. Such kiosks are generally located throughout the shopping area of the retail store and are provided to perform various information retail functions such as product demonstration (e.g. an audio/video advertisement), customer data collection (e.g. collecting and maintaining a customer profile database), and in some cases even transaction functions in which a customer may use the kiosk to tender payment for his or her items for purchase. Information retail terminals (kiosks) may be used to display product information to retail customers, or may be used as an interactive retail terminal which provides assistance to customers in response to a customer's input via a keypad or the like.

Still further, in addition to the retail terminals discussed above, many establishments have ATMs to dispense cash for the consumer to spend at the retail establishment and perform various banking functions. Such ATMs are located, not only at banks, but at gas stations, convenience stores and the like.

A feature typically common to all of the above transaction terminals is the touch-screen display. In particular, the various transaction terminals typically utilize a video keypad generated by the terminal and shown on the associated display in conjunction with the touch-screen to provide a PIN entry area. A problem with such video keypads is the ability for a third party to eavesdrop during consumer entry of a PIN and obtain the consumer's PIN. Still further, Trojan horse applications can be used to create a false PIN keypad area on the display and obtain a consumer's PIN via touch-screen entry from the bogus PIN keypad area.

What is needed is a transaction terminal that provides security for video/touch-screen PIN entry.

What is further needed is a transaction terminal that provides an indication of the only proper place for PIN entry via a video/touch-screen PIN keypad.

SUMMARY OF THE INVENTION

The present invention is a transaction terminal having a PIN entry protection device for video keypad entry of a PIN.

In one form, the present invention is a transaction terminal having a display with a display region and associated touch-screen that are adapted to show a PIN entry area and accept a PIN entry via the touch-screen. A privacy shield or barrier is provided adjacent at least a portion of the PIN entry area of the display region and touch-screen that aids in the prevention of eavesdropping during PIN entry.

Preferably, the privacy shield or barrier is molded into a bezel of the touch-screen, or the side of the display and overlays the touch-screen or video display area adjacent the video keypad.

In another form, the present invention provides a legend or label adjacent the PIN entry area indicating or directing a user to only enter PIN information or data adjacent this location. The label could be imprinted in the plastic of the display or permanently attached to the display. Labeling of the PIN entry area aids in preventing Trojan horse applications that can show a false PIN entry area on another part of the display region in order to fraudulently obtain a user's PIN.

The present invention improves the consumer's experience by providing security during entry of the consumer's PIN, ID or other private number and/or alphanumeric sequence.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set forth herein illustrates one preferred embodiment of the invention, in one form, and such exemplification is not to be construed as limiting the scope of the invention in any manner.

DETAILED DESCRIPTION

Figure 1:
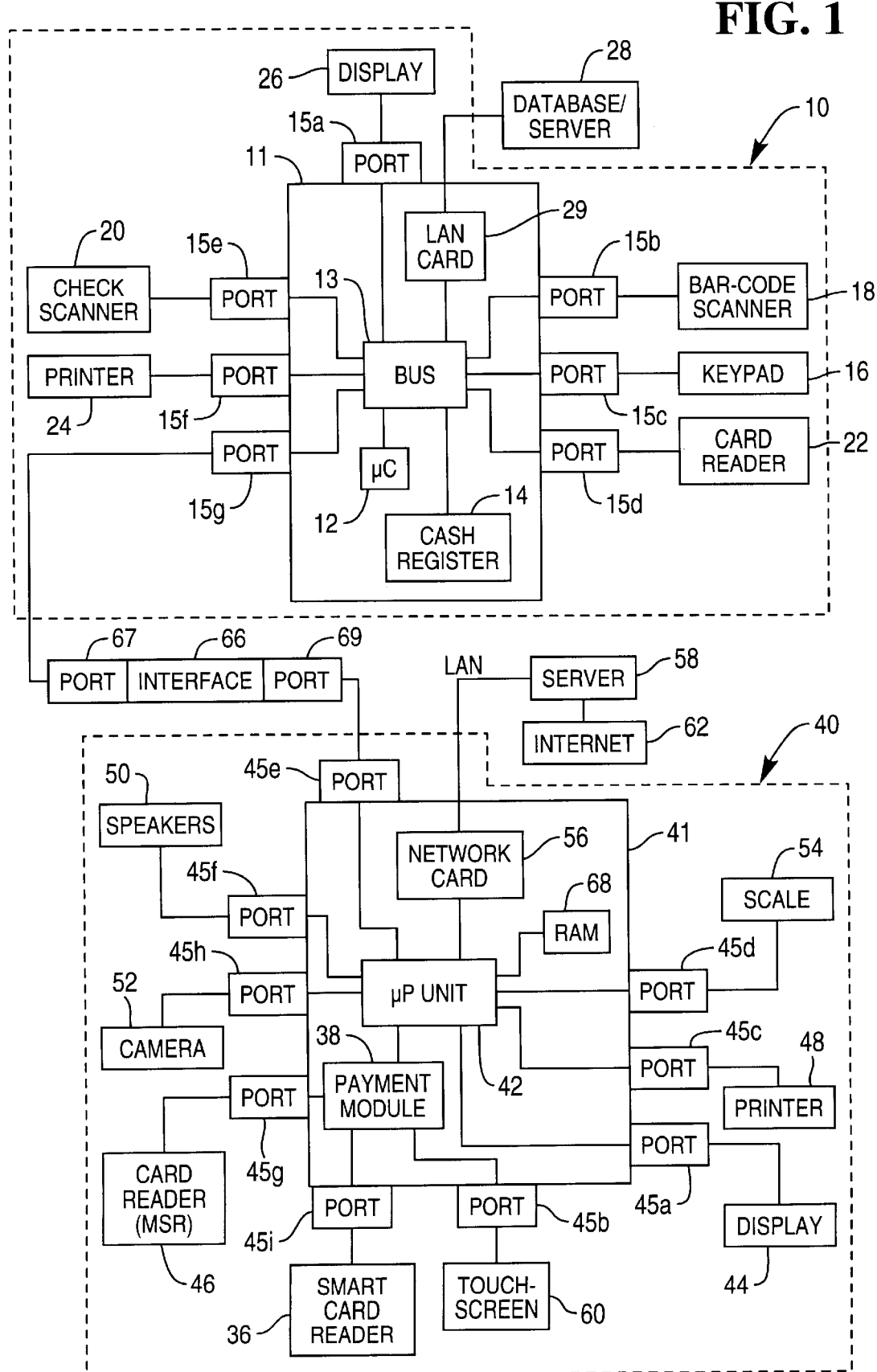
FIG. 1 is a block diagram of the components of an existing or legacy retail system and a customer service workstation intelligently coupled thereto in accordance with the present invention.

Referring now to FIG. 1, there is depicted a block diagram of a typical existing retail system generally designated 10 in electronic communication with a retail terminal or customer service workstation (CSW) generally designated 40. The existing retail system 10 will hereinafter be referred to as a legacy system 10, while the customer service workstation 40 will hereinafter be referred to by its acronym CSW 40. Further, the legacy system 10 is usually a clerk or cashier-assisted station wherein the clerk or cashier manually operates the various components of the legacy system 10. Various companies (e.g. NCR and IBM) have manufactured and/or sold such legacy systems.

It should be understood that the CSW 40 is a particular form of a retail terminal. It should thus be appreciated that the below discussion is applicable to other embodiments of retail terminals not specifically the CSW 40 shown in the figures. The various features and/or functions disclosed herein are therefore applicable to other types of retail terminals in accordance with the present principles.

The legacy system 10 typically includes a housing or case 11 that contains a microcontroller ($\mu$C) 12 which is in electronic communication with a bus 13 such that the microcontroller 12 may be electronically coupled to and in communication with various peripherals of the legacy system 10 as next described. The legacy system 10 includes a cash register 14 that is generally integral with the housing 11, but could be a stand-alone unit. The cash register 14 is electronically coupled to the bus 13 such that the opening thereof is under control of the microcontroller 12. As such, the cash register 14 is adapted to open at predetermined times as is known in the art, typically when it is necessary to tender payment.

The housing 11 includes a plurality of ports of which seven ports 15a, 15b, 15c, 15d, 15e, 15f, and 15g are shown, each of which is in electronic communication with the bus 13. It should be appreciated that the number of ports in any legacy system may be more or less than that shown, as the legacy system 10 shown and described herein is only exemplary.

The legacy system 10 includes a retail function keypad 16 that is connected to one port, 15c, such that the keypad 16 is electronically coupled to the bus 13 and thus in electronic communication with the microcontroller 12. A bar-code scanner 18 as is known in the art is connected to one port, 15b, such that it is also electronically coupled to the bus 13 which allows communication between the bar-code scanner 18 and the microcontroller 12. The bar-code scanner 18 is a typical bar-code type scanner that reads the universal product code (UPC) on the product, coupon, label, or the like in order to obtain a price and product description, or other information. The microcontroller 12 is in electronic communication with a database and/or server 28 typically via a LAN through a LAN card 29 as is known in the art. The database/server 28 is usually on-site at the retail establishment but remote from the housing 11 and the various peripherals. The database/server 28 typically contains product or price look-up (PLU) tables that return price and product description information for the scanned bar code. This information is used by the legacy system 10 to develop a receipt and calculate a total cost.

A check scanner 20 as is known in the art may also be electronically coupled to the bus 13 via a port, 15e, which allows communication between the check scanner 18 and the microcontroller 12. The check scanner 20 typically reads the account information from a check presented for payment by the customer in order to contact a check verification system (not shown). In addition to the above, the legacy system 10 may include a magnetic strip card reader (MSR) 22 as is known in the art. The MSR 22 is electronically coupled to the bus 13 via a port, 15d, which allows communication between the MSR 22 and the microcontroller 12, and reads various information from the magnetic strip of a credit or debit card (not shown) tendered for payment.

A display 26 is also electronically coupled to the bus 13 via a port, 15a, which allows communication from the microcontroller 12 to the display 26. The display 26 is typically a small CRT or LCD, or may be a 2×20 text display. The display 26 generally shows product price, item description and total cost, and is geared toward benefiting the clerk rather than the consumer because of its size and location. The display 26 is typically mounted on the housing 11 facing away from the customer and toward the clerk.

The legacy system 10 typically further includes a printer 24 that is electronically coupled to the bus 13 via a port, 15f, such that information from the microcontroller 12 regarding the various transactions may be printed, such as a customer receipt. Additionally, the legacy system 10 may include an open serial port, 15g, or ports that allow the connection of various other peripherals.

It should be appreciated that all of the various components of the legacy system 10 shown in FIG. 1 are typical of existing retail systems but may not necessarily be a part of the existing retail system to which the present CSW 40 is coupled. The legacy system 10 as shown is thus only exemplary. Further, it should be appreciated that the bus 13 and thus the type of ports 15a–g in legacy systems are typically proprietary to the manufacturer of the legacy system. Thus, additional functionality for legacy systems must rely on and be supportive of the particular proprietary mechanism. For instance, NCR of Dayton, Ohio, produced legacy systems similar to that depicted in FIG. 1, which used what is known as the OCIA bus/specification. In another instance, IBM produced similar legacy systems which used what is known as the RS485 bus/specification. The ports 15a–f of the legacy system, and the plugs or connectors therefore, are thus configured according to the appropriate configuration. Because of the use of such inflexible proprietary systems, the various peripherals must have the appropriate connector in order to communicate with the legacy system.

Still referring to FIG. 1, the customer service workstation (CSW) 40 includes a housing or case 41 that contains a microprocessing ($\mu$P) unit 42 that utilizes a microprocessor as the main controller/processor and which includes appropriate circuitry as is known in the art to operate. The microprocessor of the microprocessing unit 42 is preferably a Pentium® class or comparable microprocessor or higher (greater) as compared to a simpler microcontroller. The microprocessing unit 42 is electronically coupled to and in communication with various peripherals associated with the CSW 40 as next described and with the legacy system 10 and its associated peripherals. The housing 41 includes a plurality of ports of which nine ports 45a, 45b, 45c, 45d, 45e, 45f, 45g, 45h, and 45i are shown. It should be appreciated that the number of ports in the CSW 40 may be more or less than that shown depending on the various options and/or peripherals that are coupled thereto.

The CSW 40 includes a display 44 that is connected to one port, 45a, that is in electronic communication with the microprocessing unit 42, such that the display 44 is electronically coupled to the microprocessing unit 42 to allow electronic communication between the display 44 and the microprocessing unit 42. The display 44 is preferably a large, high-quality LCD as is known in the art, but can be any type of display.

The display 44 includes a touch-screen 60 as is known in the art that is in electronic communication with a payment module, unit, or circuitry 38 via a port 45b with the payment module 38 in electronic communication with the mircroprocessing unit 42. The microprocessing unit 42 causes video data to be sent to the display 44 as known in the art that includes information and/or data areas which present choices for the user. The microprocessing unit 42 receives information from the touch-screen 60 overlaying the display 44 upon a user pressing the touch-screen 60 in response to the information/data/questions/choices/etc. presented by the video on the display 42. The touch-screen 60 is under control of standard touch-screen drivers to interface with the microprocessing unit 42.

As described in detail below, the display 44, under control of the microprocessing unit 42, is divided into a plurality of video windows, areas, or regions depending on the mode of the CSW 40. These windows may be further subdivided into various touch-screen activated or selection areas that control various aspects of the CSW 40 and/or its various peripherals and their function. One of the interactive areas is a PIN entry area through which a user can enter his/her PIN number utilizing a video generated keypad on the display 44 in conjunction with the touch screen 60. Because of the PIN entry area, the touch screen 60 is coupled to a separate, secure payment module 38. The payment module 38 is discussed below. As well, the touch-screen 60 may allow control/use of the legacy system 10 and its peripherals.

The CSW 40 includes speakers 50, preferably stereo, for all types of audio reproduction which are in electronic communication with the microprocessing unit 42 via a port 45*f*. A printer 48 is electronically coupled to the microprocessing unit 42 via a port 45*c* for printing various items such as receipts, window or area information/data, maps, recipes, coupons, offers and the like. An electronic scale 54 is also in electronic communication with the microprocessing unit 42 via a port 45*d* such that items, produce, and the like may be weighed by the scale 54 and the weight electronically recorded and/or stored for display, printing, price computation, and/or customer profiling or the like.

A card reader 46, typically a magnetic strip reader (MSR) type card reader for reading/utilizing debit/credit cards, is likewise in electronic communication with the microprocessing unit 42 via a port 45*g*. The card reader 46 obtains information from a credit/debit and/or smart card for payment of the items, products, produce, and the like purchased via the CSW 40. In the case of ATM or ATM-like functions/ features performed by the CSW 40 or any retail terminal in accordance with the principles disclosed herein, the card reader 46 obtains information from the card for account information/data, network affiliation, and other information.

A SMART card reader 36 for reading/utilizing SMART cards is likewise in electronic communication with the microprocessing unit 42 via port 45*i* through the payment module 38. The SMART cart reader 36 obtains information from a SMART card for payment of the items, products, produce, and the like purchased via the CSW 40.

The touch screen 60, card reader 46, and the card reader 36 are all in communication with the payment module 38 that is in communication with the microprocessing unit 42. The payment module 38 provides secure processing and/or date encryption of account numbers and the like from the card readers 36 and 46, and the touch screen 60, before the data reaches the microprocessing unit 42. The payment module 38 includes circuitry and instructions as is known in the art to process the data from the card(s) and provide feedback to the display 44 as necessary. As well, the payment module 38 isolates the data from the microprocessing unit 42 and other peripherals until the data is secure/encrypted and thus is ready for further processing. As such, general information from the user's card is not on a general systems bus.

Additionally, the CSW 40 incorporates a camera 52 as is known in the art for allowing video-conferencing. The camera 52 is electronically coupled to the microprocessing unit 42 via a port 45*h* to allow electronic communication therebetween.

The microprocessing unit 42 is electronically coupled to memory (e.g. RAM) 68 as is known in the art such that there is electronic communication between the memory 68 and the microprocessing unit 42. The memory 68 stores a plurality of instructions or programs that allow the CSW 40 and the various peripherals to operate as is known in the art and additionally in accordance with the principles presented herein.

The CSW 40 also optionally includes a network card/ adapter 56 that allows connection to a server 58 as is known in the art and/or network such as a LAN or WAN. It should be appreciated that the network card 56 may not be necessary, depending on the configuration. In the case where there is no network card 56, the microprocessing unit 42 would be in direct communication with the server 58. The server 58 is preferably a point-of-service (POS) type server that would be in communication with various other POS type retail terminals (not shown) and/or kiosk type retail terminals (not shown). As well, the server 58 stores various information/data in databases, PLUs, and the like. Such information/data, without being exhaustive, may pertain to product information, product price, product location within the store, a store map/locator, product discounts/offers, coupons, recipes, inventory, etc. The CSW 40 is connectable to the internet 62 via the server 58 to allow the showing of internet pages/information/advertisements on the display 44 and perform interactive functions as are known in the art by web-based technology with the aid of the touch-screen 60.

Other peripherals not discussed herein as coupled to the CSW as are known in the art may be coupled to ports of the CSW 40 and thus in electronic communication with the microprocessing unit 42. As well, the various devices/ peripherals associated with the legacy system 10 may be duplicated by the CSW 40. The CSW 40 is flexible in architecture to allow the connection to and communication with a plurality of various types of peripherals, including the peripherals and devices of the legacy system 10.

The CSW 40 also includes at least one port 45*e* that is internally in electronic communication with the microprocessing unit 42 and adapted to allow the CSW 40 to be coupled to and be in electronic communication with an external system namely, the legacy system 10. The open port 45*e*, like the other ports 45*a*–*d* and *f*–*g*, may be a serial RS232 type port that interfaces with the bus architecture of the CSW 40. In order for the port configuration of the legacy system 10 (e.g. the NCR OCIA, the IBM RS485, or the like) to interface with the CSW 40 (RS232), it may be necessary to provide an interface 66. The interface 66 would have a port 67 to accept the port configuration of the legacy system and have an RS232 port 69 (or the like) for connection to the port 45*e* of the CSW 40. Respective cables would connect to the interface 66 and the legacy system 10 and to the CSW 40 appropriately. The interface 66 may be internal to the CSW 40 rather than external as depicted in FIG. 1.

In the case of the interface 66 being internal to the CSW 40, the interface 66 may be modular in order for the CSW 40 to accommodate the various number of interfaces that may be needed to intelligently couple the particular legacy system to the present CSW. Each type of legacy system may require a specific interface, but not necessarily so. With or without the interface 66 assisting in coupling the legacy system 10 with and to the present CSW 40, the CSW 40 is adapted to obtain the information/data from the bus structure of the legacy system 10 via one of its ports and utilize the information/data.

In another form, the port 45e (as well as all of the other ports 45a–d and f–h) of the CSW 40 may be a universal serial bus (USB) port that is electronically coupled to the microprocessing unit 42 via a universal serial bus. In this form the interface 66 would include a port 67 in the configuration of the port 15g of the legacy system 10, and a USB port 69 to correspond to the port 45e of the CSW 40. With the CSW 40 running Windows® CE™ or NT™, or a similar operating system, one of ports 45e or all of the ports 45a–h of the CSW 40 are preferably USB type ports.

The CSW 40 is preferably running an operating system such as one of the Windows® programs (e.g. CE™ or NT™) by Microsoft Corporation, or a comparable operating system that handles multiple program/function windows, areas, or regions on the display 44. The processing power and operating system of the CSW 40 combine to allow the CSW 40 to communicate with the legacy system 10 and utilize the information present on the bus 13 of the legacy system. This is due to the fact that on such legacy systems, the bus 13 carries all of the information/data exchanged between the microcontroller 12 and the various peripherals of the legacy system 10. Since this is the case, the CSW 40 can utilize the information/data on the bus 13 of the legacy system 10 to operate or supplement the operation of its components and/or peripherals. As well, the information/data gathered by the components/peripherals of the CSW 40 may be used by the legacy system 10, however, in accordance with the present invention, the former is typically the case.

As an example of the sharing of information/functionality between the legacy system 10 and the CSW 40 intelligently coupled thereto, the scale 54 of the CSW 40 weighs an item and the type of item is selected on the display 44 via the touch-screen 60. The CSW 40 may obtain product and price information from a PLU in the database/server 28 of the legacy system 10.

As indicated above, the present CSW 40 includes a large display 44 having a touch-screen 60, and runs an operating system that allows multiple windows, areas or regions on the display 44, one for each aspect, program, or feature. In conjunction with the touch-screen 60, the various windows, areas or regions of the display 44 may be interactive to any degree as desired and/or as necessary to implement the various functions/features as described herein and others. As well, the CSW 40 is adapted to show various screens depending on the mode of the CSW 40, each of which may utilize multiple interactive windows, areas, or regions in conjunction with the touch-screen 60.

Figure 2:
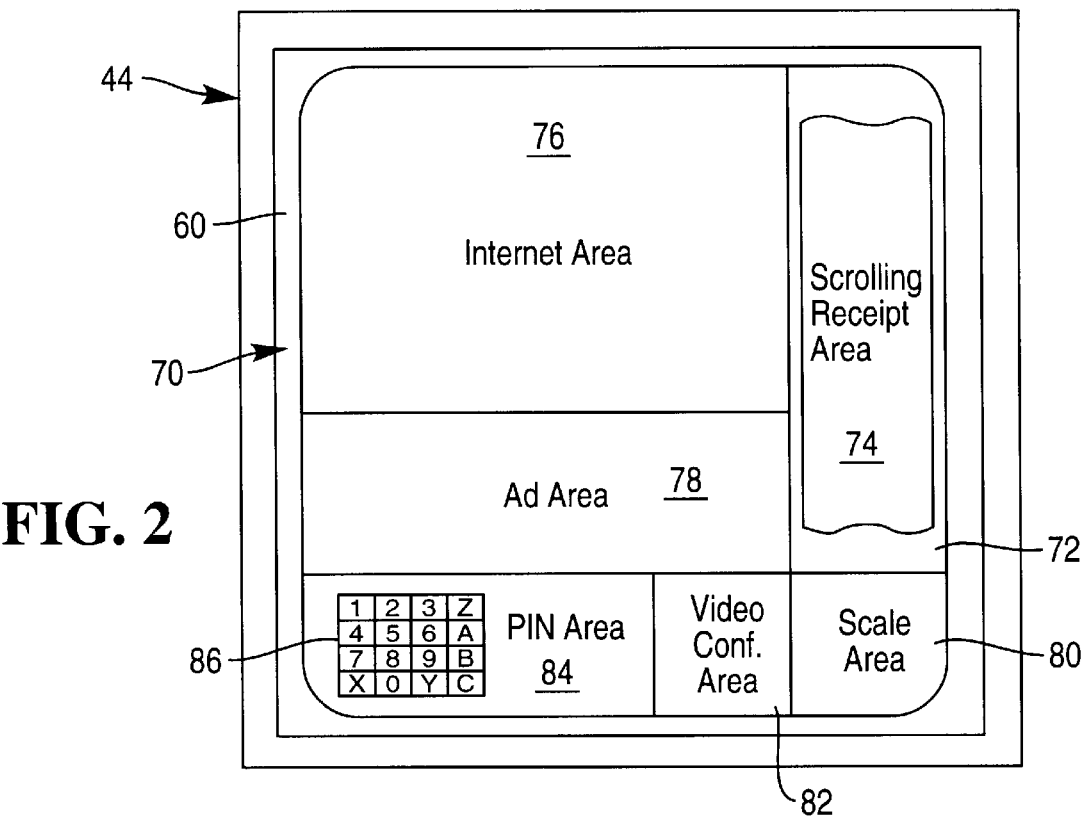
FIG. 2 is a depiction of the display of the present customer service workstation wherein the display is showing an active mode screen.

With reference now to FIG. 2, there is depicted a representation of the display 44 of the CSW 40 having a display area 70. The screen depicted in the display area 70 of FIG. 2 is only exemplary of the type of screen that may be shown within the display area 70. As such, some of the windows, areas, or regions may be interactive in conjunction with the touch-screen 60, or may be purely informational. The type, size, and number of windows, areas, or regions are not absolute and may vary according to mode or usage. The screen depicted in FIG. 2 may be termed a customer usage mode. The customer usage mode screen is typically shown when a consumer is ready to use the CSW 40 and when the CSW 40 is in use. When the CSW 40 is not in use, the customer usage mode screen may be replaced by a promotional program, music, program video, and the like.

The display area 70 includes an internet or web pages area 76 that is under control of a common internet browser or the like that is accessed through the network card 56 and the server 58. The internet area 76 is used to present advertisements, web pages and the like, and perform various functions such as customer surveys, etc. using standard internet technologies. Control of the web browser is accomplished via the touch-screen 60 of the display 44. It is preferable that the internet area 76 is the largest window of the display 44. The internet area 76 obtains its data/information from the internet connection 62. It should be appreciated that other means of obtaining internet information/data and/or connecting to the internet are possible and contemplated. Thus, the information may come from any source.

In addition to the internet area 76, there may also be an advertisement area 78 that is separate from the internet area 76 in which may be shown advertisements and/or announcements. The content for the advertisement area 78 may be stored in the memory 68 or obtained from the server 58. The advertisement content may be static or dynamic and/or also interactive. It should be appreciated that the advertisement area 78 may not be used in preference to a larger internet area 76, since the internet area 76 may as well show advertisements.

As another feature, the display area 70 includes a scrolling receipt region 72 in which is shown a facsimile of a typical retail paper receipt 74. The retail receipt 74 preferably scrolls along the receipt area as products or items are scanned by the scanner 18. The product price and description, and any other information are sequentially shown on the retail paper receipt facsimile 74 and are preferably of a type size that allows easy reading thereof. A paper copy of the receipt may be provided at the end of the transaction by the printer 48.

As a further feature, the display area 70 includes a scale weight area 80 that displays the "live weight" of produce items, bulk goods, deli items, etc. as measured by the scale 54. The scale weight area 80 may not always be shown on the display area 70, but only be invoked and displayed when the scale 54 senses an item placed thereon for weighing. Alternatively, the scale weight area 80 may always be displayed, but be blank with regard to contents when there is nothing in the scale 54 to be weighed.

In addition to showing the product weight in the scale weight area 80, there may be displayed a listing of the various products sold within the retail store that need to be weighed in order to determine its price, wherein the customer then touches the appropriate item via the touch-screen 60. Alternatively, the keypad 16 of the legacy system 10 or other means of either the legacy system 10 of the CSW 40 may be used to enter the information. The scale 54 weighs the item and obtains the item price and item description from the database/server 28 or server 58, which is then shown on the scrolling receipt 74 within the receipt area 74.

As still another feature, the display area 70 may include a video conference area 82 that is used to conduct video-conferencing in conjunction with the camera 52. If desired, a consumer may activate video-conferencing by either touching the appropriate places on the screen, preferably within the video conference area 82, or by another activation means. A consumer may wish to ask a store manager a question or interact with a staff member in a certain department. In some instances, video-conferencing may be automatic should a problem be detected by the CSW 40 of for any other reason. Video-conferencing may be initiated by store personnel for whatever reason, such as when there is an error or problem.

In accordance with an aspect of the present invention, information that is input into the CSW 40 or the legacy system 10 may be compiled into user transaction data. Particularly and preferably, items such as food that are purchased via the CSW or legacy system 10 may constitute at least a portion of the transaction data. The transaction data is utilized to obtain, retrieve, and/or generate recipes that have at least one of the purchased food and/or condiment items (collectively "food products") as an ingredient.

As the food products are scanned by the scanner 18 or weighed by the scale 54 of the CSW 40, the microprocessing unit 42 obtains or retrieves from the server 58 or via the internet 62 recipes that satisfy the requisite criteria. Since there are a vast number of recipes, the present invention preferably keys off several main purchased items rather than minor purchased items. Main purchased items would constitute meats, vegetables, fruits, etc. that are typically a large proportion or main ingredient of the recipe. As well, the quantity of each purchased item may be used as a factor to perform the analysis. Further, the totality of purchased food items might be used as a factor to sort the retrieved recipes that are initially identified. As an example, if a consumer has purchased chicken and picante sauce, various Mexican recipes may be retrieved. The threshold for sorting and retrieving the recipes could be set for one, two, or more items, either as main or minor items, or combinations of same.

The recipes could be printed as part of the receipt by the printer 48 or separately therefrom. Retrieval and printing of the recipes may also be optional through user interface/query. A list of the recipes generated or obtained by the CSW 40 might be shown on the display 44 during checkout which could then be selected by the user via the touch-screen 60 for printout by the printer 48 rather than automatically printed. These may be shown and selectable by the user in real-time during the checkout process rather than waiting for the end of the checkout session.

As well, the transaction data may be used to generate discounts, offers and/or incentives on food products that are ingredients in the retrieved recipes but not purchased. Alternatively, such discounts and/or offers may be for the same type of food items that may be purchased the next time. Various combinations of the above are contemplated while not explicitly discussed.

The transaction data may be used to generate discounts, offers, and/or incentives on non-food, kitchen accessories type items, such as pots, pans, utensils, and gadgets. If the store does not carry such items, the discount, offer, and/or incentive may be tied to another store that is in cooperation with the presenting store. Such incentive and/or cooperation schemes are known in the art.

Additionally, the CSW 40 may be adapted to receive a grocery or item list that would be correlated against the recipe database to retrieve recipes that utilize one or more of the food items as an ingredient. The retrieved recipes could be printed and/or checked against an inventory list for the particular store or related store at another location, for the availability/price/type of the ingredients of the recipe. The recipes might generate discounts, offers and/or incentives that are currently in force for various ingredients in the recipe or items needed for preparing the recipe (e.g. non-food items). As well, the grocery list may be sent and checked via the internet 62 prior to shopping, since the CSW 40 is connectable to the internet 62.

It should be appreciated that the foregoing use of transaction data to generate recipes, food and non-food offers/discounts/incentives, inventory checking and/or the loading of grocery lists into the system, is not limited to the present CSW 40, but is applicable to all types of food checkout systems. Thus, other retail terminals and/or systems such as kiosks, point-of-service terminals, and the like, would be capable of utilizing the transaction data as explained above. Further, the transaction data may be stored for a particular user. The historical transaction data may be then used either separately or in conjunction with present transaction data to generate and/or retrieve various information/data.

Because it is becoming popular for retail establishments to issue customer cards or loyalty cards and/or loyalty IDs, the CSW 40 preferably includes a personal identification number (PIN) area 84 for entry of the loyalty ID. As well, depending on the mode of the CSW 40, the PIN area 84 may be used to enter the PIN for a user's credit/debit/ATM card or the like. The customer enters their loyalty ID or PIN as the case may be via the video keypad 86 within the PIN area 84 via the touch-screen 60 or other device, or by some other means. In the case of entering a loyalty ID, the PIN area 84 may then show account balances, special promotions for loyalty ID customers, or allow the consumer to manage their customer loyalty profile(s). In the case of entering a PIN for credit/debit/smart card use or an ATM card should the retail terminal 40 support this function, the PIN area 84 may show transaction options or the like that are available to the user.

These features/functions may be shown within the PIN entry area 84 as selected by the customer via the video keypad 86 or the like, or on a separate screen. The CSW 40 architecture is designed to provide a fully secure, encrypted PIN entry function so that a separate PIN module is not needed. Since the present CSW 40 is an open environment, it is necessary to allow PIN encryption on a touch screen.

Because a PIN is private and secret, one aspect of the present invention is to provide protection against a third party from obtaining a user's PIN or loyalty ID (collectively "PIN"). Fraudulent obtaining of a user's PIN by a third party may be accomplished in a variety of ways. One way is to watch a user enter their number from a side viewing angle relative to the display 44. Another way is to install a Trojan horse program into the system that causes the display to generate a PIN entry area at a location on the display area that is different than the authentic PIN entry area. The Trojan horse program then gathers touch-screen data from the bogus PIN entry area.

Figure 5:
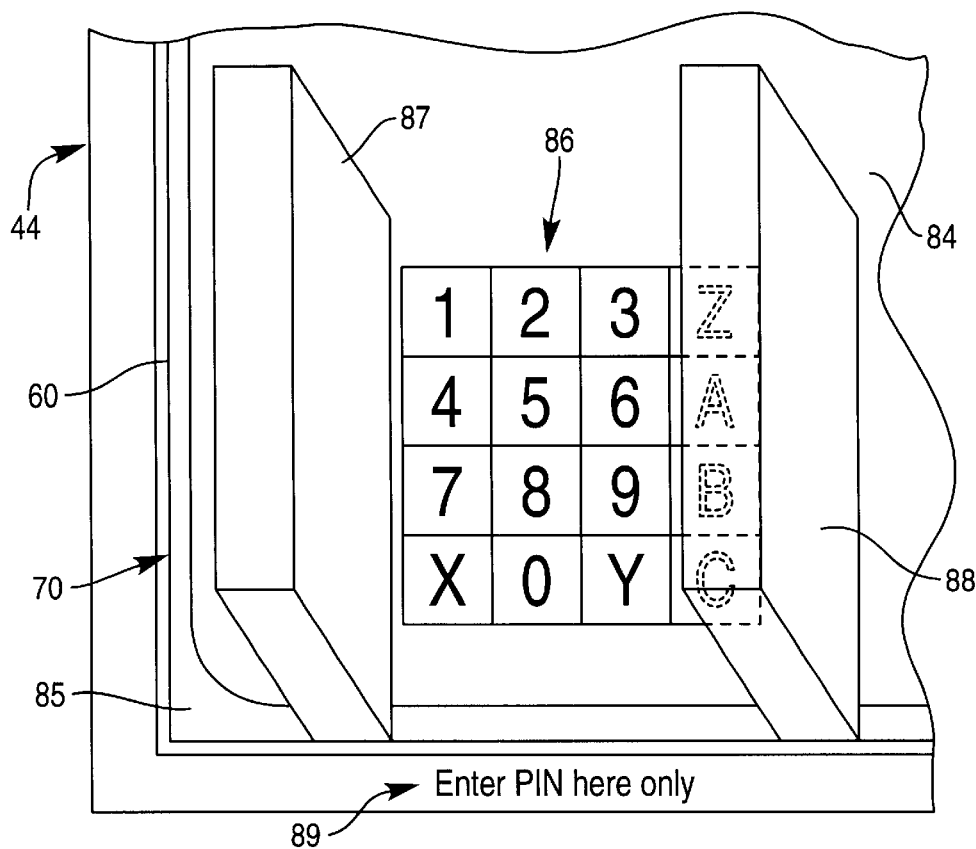
FIG. 5 is an enlarged perspective view of the video keypad/PIN entry area depicted in FIG. 4.
Figure 4:
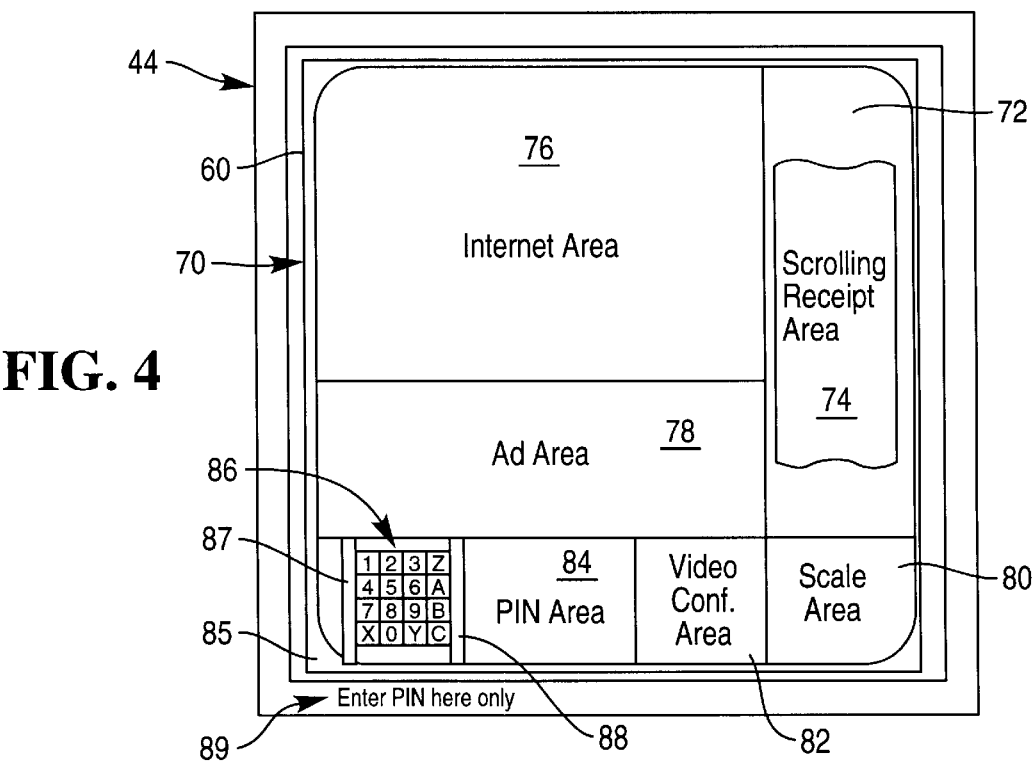
FIG. 4 is a depiction of an alternative form of the display of the present customer service workstation wherein the display is showing an active mode screen and includes a PIN privacy shield in accordance with the principles of the present invention.

With reference to FIGS. 4 and 5, there is shown an embodiment of the display 44. The PIN area 84 includes a video keypad 86 that is generated by the microprocessing unit 42 and shown by the display 44. The video keypad 86 is used in conjunction with the touch-screen 60 to enter/receive a user's PIN, ID or the like (collectively "PIN"). Located at one side of the video keypad 86 is a privacy barrier or shield 87 that is situated on or over the touch-screen 60 and/or the display area 70. The barrier 87 extends a distance upwardly from the touch-screen 60 to block viewing from the side on which it is located but still allow the user to easily enter the PIN. The barrier 87 also preferably extends a distance on both ends further than the corresponding side defining the video keypad 86. In one form, the barrier 87 is attached to a bezel 85 of the touch-screen 60 and extends over the touch-screen area adjacent the video keypad 86. The barrier 87 may be attached to the display 44 or directly on the touch-screen 60 or the display area 70.

It should be appreciated that barrier 87 may not be necessary as part of the present privacy shield depending on the placement of the video keypad 86 within the PIN area 84 relative to the side of the frame of the display 44 and the height of the frame of the display 44 relative to the display area 70. If the video keypad 86 is proximate the frame or side of the display 44 and the height of the frame or side of the display 44 is adequate, this may constitute a sufficient privacy shield for that side only. Intentional placement of the video keypad 86 proximate the side/frame of the display 44 may, in conjunction with other barrier(s) achieve a privacy shield for PIN entry.

Located at another side of the video keypad 86 is a barrier or shield 88 that is situated on or over the touch-screen 60 and/or the display area 70. The barrier 88 extends a distance upwardly from the touch-screen 60 to block viewing from the side on which it is located but still allow the user to easily enter the PIN. The barrier 88 also preferably extends a distance on both ends further than the corresponding side defining the video keypad 86. In one form, the barrier 88 is attached to the bezel 85 of the touch-screen 60 and extends over the touch-screen area adjacent the video keypad 86. The barrier 87 may be attached to the display 44 or directly on the touch-screen 60 or the display area 70.

In the case where only one barrier is necessary or desired, it is preferable that barrier 88 be the single barrier rather than barrier 87. The side of the video keypad 86 where barrier 88 is located is not proximate a side of the display as is the case where barrier 87 is located. Of course, the above changes depending on the location of the video keypad 86 in the display area 70.

As well as extending essentially perpendicular to the plane of the touch-screen 60, the barrier 88 might include a horizontal component (not shown) that at least partially extends over the top of the video keypad 86. In like manner, as well as extending essentially perpendicular to the plane of the touch-screen 60, the barrier 87 might include a horizontal component (not shown) that at least partially extends over the top of the video keypad 86.

The barriers 87 and 88 either alone or together form a physical privacy shield about the video keypad 86 that blocks a third party from seeing the video keypad 86 and thus a user's PIN during PIN entry. It should be appreciated that additional upper and/or lower barriers with or without horizontal components, may be included, although not shown, depending on the location of the video keypad 86 on the display area 70 and the location and/or environment of the CSW 40. One or more barriers would preferably be used. Typically, a third party would be able to view the video keypad 86 from the side rather than from the top or bottom, thus the showing of only side barriers 87 and 88. It should as well be appreciated that other forms of privacy shields or barriers other than that shown may enclose or surround the video keypad 86.

Figure 6:
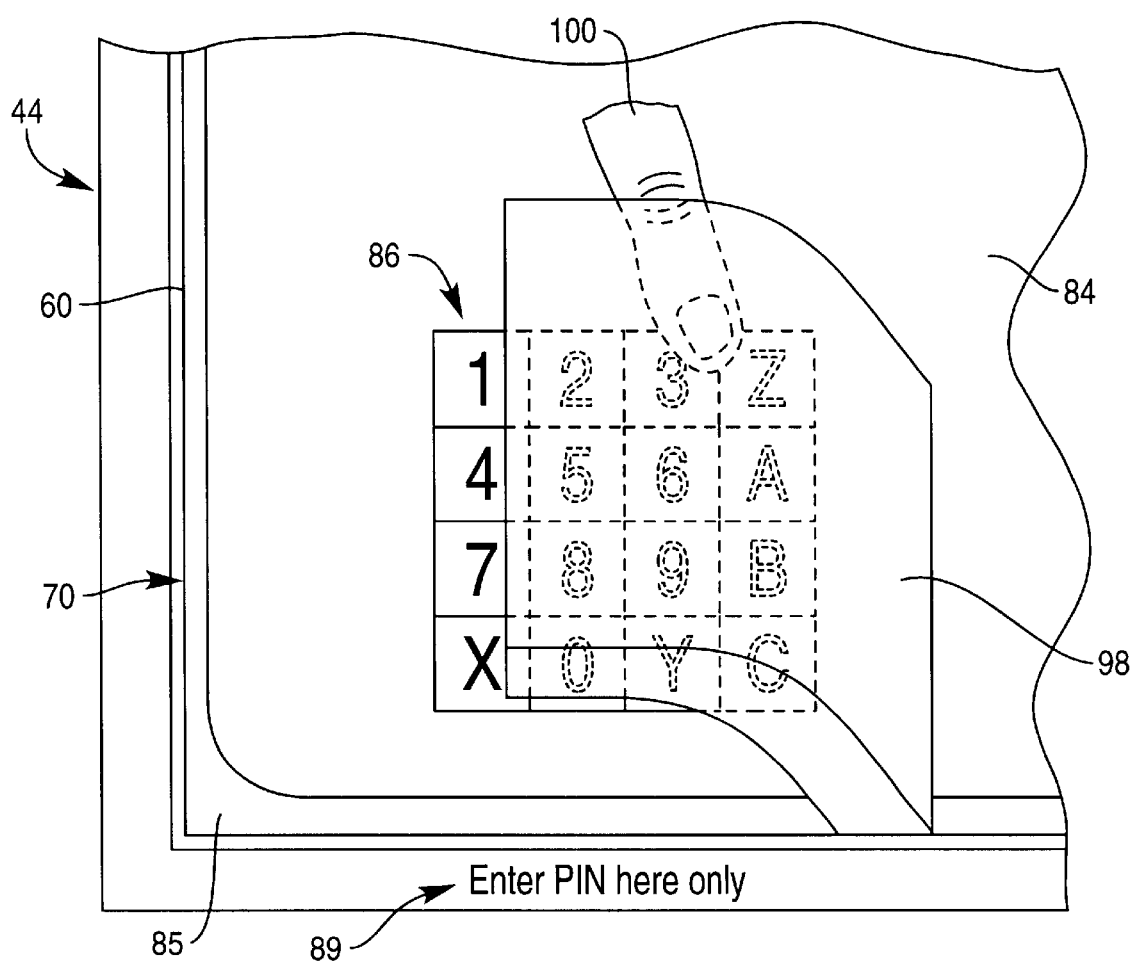
FIG. 6 is an enlarged perspective view of the video keypad/PIN entry area having an alternative embodiment of a privacy barrier.

In this regard, attention is now directed to FIG. 6, wherein an alternative embodiment of a privacy shield or barrier is shown. Located on one side of the video keypad 86 is a single, curved privacy barrier or shield 98. The shield 98 is situated on or over the touch-screen 60 and/or display area 70 on one side of the video keypad 86 and is curved to extend above and over at least a portion of the video keypad 86. A user, denoted by finger 100, is able to reach and use the video keypad 86 underneath the shield 98. In order to not obstruct the view of a user, the shield 98 is preferably made of a semi-opaque material such as smoked plastic or the like that allows an amount of light therethrough to enable the user to see the video keypad 86 (from a close distance) but not allow a third party a distance therefrom to see the video keypad 86. It should be appreciated that various combinations of barriers/shields as shown and described herein may be used to provide a privacy shield or barrier about or at least partially surrounding the video keypad 86.

In addition to the physical barriers of shields 87 and 88, and/or barrier/shield 98 or more, the display 44 includes a legend or label 89 that is located directly below or adjacent the video keypad 86. The legend 89 may be molded, etched or overlayed onto the display 44 (as depicted), the bezel 85, or other part/component. A separate label or tag may as well be placed in the same or similar location. In FIGS. 4–6, the legend 89 says "Enter PIN here only." The legend 89 is preferably immediately adjacent the video keypad 86 to indicate the location of the authorized or authentic PIN entry as opposed to a fake or fraudulent PIN entry area/keypad. As indicated above, a fake PIN pad could be placed on the display to obtain PIN numbers entered thereon for later fraudulent use. By labeling the real PIN area with the adjacent legend 89 to indicate the only real or authentic area for PIN entry, the device would effectively secure the unit from Trojan horse applications or the like.

Figure 3:
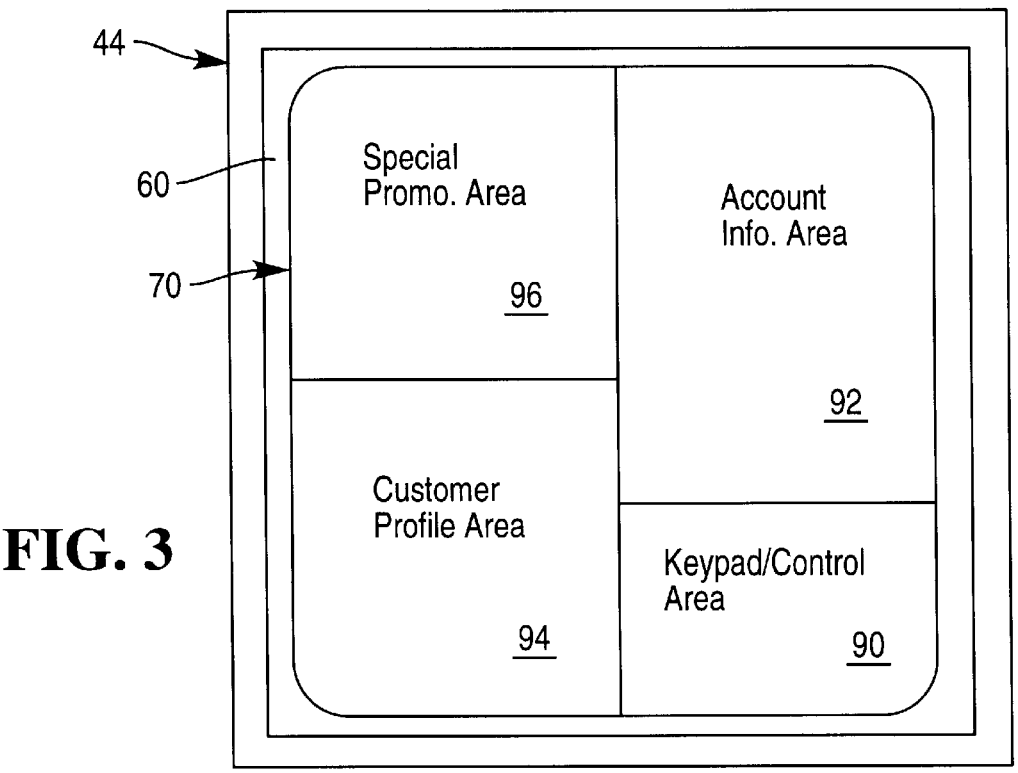
FIG. 3 is a depiction of the display of the present customer service workstation wherein the display is showing a PIN activated screen.

With reference to FIG. 3, there is depicted display 44 of the CSW 40 after PIN entry where a separate screen is used. The screen depicted in the display area 70 is exemplary of the CSW in a PIN activated mode. The display area 70 may include a video keypad/control area 90 for navigating to and through the various areas. The CSW 40 may include an account information area 92 where the customer may view their account with the retail establishment. A customer profile area 94 may also be provided where the consumer may view their current profile as used by the retail establishment. The profile may be manipulated so far as allowed by the retail establishment. As well, the display area 70 may include a special promotion area 96 wherein "loyalty" customers may learn of item promotions especially for the loyalty customer.

It should be appreciated from the foregoing, that the CSW 40 uses a plurality of windows or areas to allow the consumer to view various transactions pertaining to the retail establishment as well as present advertisements and/or information in an interactive manner. While these areas have been shown relative to two screens (i.e. FIGS. 2 and 3), it should be understood that more screens may be necessary, and that not all of the areas may necessarily be shown. Other areas as well may be added.

Between transactions, or if the CSW 40 is not in use by a consumer, the CSW 40 may provide entertainment content or shopping information such as store maps, item locators, etc. via the display 44 and/or speakers 50. In this regard, the CSW 40 acts as an information kiosk. Thus, various modes may be presented by the CSW 40.

What has been shown in the Figures and discussed above is a customer service workstation that consolidates all relevant customer-facing devices into a single, simple console. The CSW 40 is also intelligently connectable to any legacy system with the appropriate interface/ports. Since the CSW 40 includes a microprocessing unit 42, and all of the information/data on the legacy system 10 can be read and used by the CSW 40 from the port 15g of the legacy system, the CSW 40 adds features and functionality to any legacy system without modification to the legacy system. Further, the present CSW 40 adds all of the current features that would typically have to be added separately.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transaction terminal comprising:
   a processing unit;
   a display in electronic communication with said processing unit and having a display area, said display area including a plurality of information display sections;
   a touch-screen overlaying at least part of said display area and in electronic communication with said processing unit;
   memory in electronic communication with said processing unit and containing a plurality of instructions, which, when executed by said processing unit causes said display to depict a PIN entry area within one of said plurality of information display sections, and allows entry of a PIN via said PIN entry area in conjunction with said touch-screen;
   a privacy shield configured to inhibit viewing of said one of said plurality of information display sections; and
   a legend situated on said display adjacent said one of said plurality of information display sections, said legend providing an indication of the only authentic place to enter a PIN.

2. The transaction terminal of claim 1, wherein said privacy shield comprises:
   a first barrier on a first side of said PIN entry area; and
   a second barrier on a second side of said PIN entry area.

3. The transaction terminal of claim 1, wherein said privacy shield is attached to and extends from a bezel of said touch-screen.

4. The transaction terminal of claim 2, wherein said second side is diametrically opposite said first side.

5. The transaction terminal of claim 1, wherein said privacy shield comprises:
   a barrier having a vertical component extending from a side of said one of said plurality of information display sections and a substantially horizontal component depending from said vertical component and situated over at least a portion of said one of said plurality of information display sections.

6. The transaction terminal of claim 5, wherein said barrier is comprised of a translucent plastic.

7. The transaction terminal of claim 1, wherein said indication is a written indication.

8. The transaction terminal of claim 1, wherein said indication is a graphic indication.

9. A transaction terminal comprising:
   a processing unit,
   a display in electronic communication with said processing unit and having a display region, said display region including a plurality of information display sections;
   a touch-screen overlaying at least a portion of said display region and in electronic communication with said processing unit;
   memory in communication with said processing unit and containing a plurality of instructions, which, when executed by said processing unit causes said display to show a PIN keypad in one of said plurality of information display sections below said touch-screen and, in conjunction with said touch-screen, allows PIN entry by a user;
   a barrier disposed around said touch-screen and adapted to inhibit viewing of said one of said plurality of information display sections by a third party; and
   a legend disposed on said display adjacent said one of said plurality of information display sections indicating the only authorized area for PIN entry.

10. The transaction terminal of claim 9, wherein said display is an LCD.

11. The transaction terminal of claim 9, wherein said barrier comprises:
    a wall adjacent a first side of said one of said plurality of information display sections.

12. The transaction terminal of claim 9, wherein said barrier comprises:
    a first wall adjacent a first lateral side of said PIN keypad; and
    a second wall adjacent a second lateral side of said PIN keypad.

13. The transaction terminal of claim 12, wherein said first and second walls are attached to and extend from a frame of said touch-screen.

14. The transaction terminal of claim 12, wherein said first and second walls extend at least the length of the sides of said PIN keypad.

15. The transaction terminal of claim 9, wherein said barrier comprises:
    a barrier having a vertical component extending from a side of said one of said plurality of information display sections and a substantially horizontal component depending from said vertical component and situated over at least a portion of said one of said plurality of information display sections.

16. The transaction terminal of claim 15, wherein said barrier is comprised of a translucent plastic.

17. A retail terminal comprising:
    a microprocessing unit;
    a display in electronic communication with said microprocessing unit and having a display area, said display area including a plurality of information display sections;
    a touch-screen overlaying at least a portion of said display and in electronic communication with said microprocessing unit;
    memory in electronic communication with said microprocessing unit and containing a plurality of instructions, which, when executed by said microprocessing unit causes said display to show a PIN keypad within one of said plurality of information display sections, and allows entry of a PIN by a user via said PIN keypad in conjunction with said touch-screen;
    a privacy shield disposed adjacent said one of said plurality of information display sections and configured to inhibit view of said PIN keypad by a third party; and
    a label permanently disposed adjacent said one of said plurality of information display sections, said label indicating said PIN keypad as the only authorized area for PIN entry.

18. A transaction terminal comprising:
    a processing unit;
    a display in electronic communication with said processing unit and having a display area, said display area including a plurality of information display sections;
    a touch-screen overlaying at least part of said display area and in electronic communication with said processing unit;

memory in electronic communication with said processing unit and containing a plurality of instructions, which, when executed by said processing unit causes said display to depict a PIN entry area within one of said plurality of information display sections, and allows entry of a PIN via said PIN entry area in conjunction with said touch-screen; and a legend located adjacent to said one of said plurality of information display sections, said legend configured to instruct a user to enter a PIN only in said PIN entry area.

19. The transaction terminal of claim 18, wherein said legend includes a written indication which instructs said user to enter said PIN only in said PIN entry area.

20. The transaction terminal of claim 18, wherein said legend includes a graphic indication which instructs said user to enter said PIN only in said PIN entry area.

21. The transaction terminal of claim 18, wherein said legend is printed on a label which is located adjacent to said one of said plurality of information display sections.

22. The transaction terminal of claim 18, further comprising a privacy shield configured to inhibit viewing of said one of said plurality of information display sections, wherein said privacy shield extends over at least a portion of said one of said plurality of information display sections.

\* \* \* \* \*